UNITED STATES PATENT OFFICE.

ARTHUR STOLL, OF BASEL, SWITZERLAND, ASSIGNOR TO THE CHEMICAL WORKS, FORMERLY SANDOZ, OF BASEL, SWITZERLAND.

PROCESS FOR THE MANUFACTURE OF HIGH-CLASS PEROXIDASE PREPARATIONS.

1,324,752.      Specification of Letters Patent.      Patented Dec. 9, 1919.

No Drawing.      Application filed November 7, 1918. Serial No. 261,568.

*To all whom it may concern:*

Be it known that I, ARTHUR STOLL, Phil. Dr., a citizen of the Swiss Republic, residing at Fabrikstrasse 60, Basel, Switzerland, have invented certain new and useful Processes for the Manufacture of High-Class Peroxidase Preparations, of which the following is a specification.

Peroxidases are enzyms which activate peroxids. Their typical reaction is the transference of oxygen from hydrogen peroxid to guaiaconic acid or to polyphenols (Euler-Pope "*General Chemistry of the Enzymes*" Wiley 1912.65). Up to now several scientists, among others Bach and Chodat (*Chem. Ber.* 1903, 36,600), E. de Stoecklin (*Trav. de l'Inst. de Bot.* 1907, VII ser. vol. 7.17), Bach and Tscherniak (*Chem. Ber.* 1908, 41, 2345), Euler and Bolin (H. 1909, 61, 1), Deleano (*Biochem. Z.* 1909, 19,266), Bach (*Chem. Ber.* 1910, 43,362, and 1914, 47,2122) have made peroxidase preparations from pumpkins or horseradish roots or turnips; the vegetables were pounded up and pressed or extracted by dilute alcohol and from the juice or extract thus obtained the crude peroxidase was isolated by fractional precipitation with strong alcohol. The further purification was made by treating with basic lead acetate or by treating with kaolin or other suitable adsorption agent in order to remove the proteins and afterward by subjecting the peroxidase solutions to dialysis. By all these methods, however, preparations of relative little activity were obtained. A. Bach (1, c. 1914) has obtained, as known so far, the most active peroxidase preparation, but the yield obtained was very small. The hereafter described crude product shows a 4 to 8 times, and the refined preparation an 18 times more powerful activity than an equal quantity of Bach's preparation.

The invention relates to the preparation of peroxidase of high activity with a better yield and by a series of operations which can easily be worked out on a technical scale in spite of the high sensibility generally owned by the enzyms. According to this method dialysis and adsorption is also used for the purification of the enzyms, but the similitude with the known methods is only superficial. The two operations for elimination of the soluble ingredients of the peroxidases are executed while the enzym is still contained in the natural cellular tissue. It is not the enzym which is now being dialyzed, but the inactive ingredients and, contrary to previous methods, the enzym itself is fixed to the adsorption agent, the natural cellular tissue. It is only after this operation that the peroxidase is extracted from the cellular substance by an extracting agent which so far has not been used for this purpose, viz: dilute alkali.

Now my invention relates to the preparation of peroxidase preparations of high activity with a better yield and by a series of operations which can easily be worked out on a technical scale in spite of the high sensibility generally owned by the ferments. The thus prepared organic vehicles of peroxid oxygen may be used in the chemical industries and for therapeutical purposes.

I have found that the peroxidases are fixed in the insoluble vegetal substance, by putting into diluted acid slices of parts of plants rich in peroxidases, for instance *Cucurbita Pepo* L, *Cochlearia Armoracia* L, *Brassica rapa* L.

When the slices of plants are washed afterward, the other not precipitated substances accompanying the ferment can be washed out without losing much of the ferment itself. The peroxidases are liberated again with dilute alkalis; the extract thus obtained is purified in the well known manner by fractional precipitation with alcohol; from the concentrated solution the very active preparations are separated by addition of an excess of alcohol in form of a yellowish powder.

For many purposes the preparation in this state is pure enough, *i. e.* also for injections. Its solutions in water can be pasteurized and used for intravenous injection in large quantities and without causing any harm.

From concentrated aqueous solution of these peroxidase preparations a further quantity of inactive substance can be precipitated with mercurial salts, for instance mercury chlorid, to such an extent that the activity of the final preparation which has been separated from the solution with an excess of alcohol, rises to five times its former degree.

The treatment with mercurial salts of the crude peroxidases and their separation into active soluble and inactive precipitable substances is specific and lead to an unexpected result. The precipitable substance is very similar to the active part and does not yield proteid reactions. Silver and copper do not precipitate the inactive body. Whereas tannin precipitates also the enzym with the inactive matter. The possibility of the use for mercurial salts for this purpose could not be anticipated, since oxidation ferments are stated to be sensitive to mercury-chlorid (Oppenheimer, *Die Fermente*, 4 ed., page 796, 1913).

The preparations thus obtained form a reddish brown powder, stable in storing, being however very sensitive to strong acids. Their activity is best determined by measuring the fastness of the oxidation of pyrogallol into the orange yellow coloring matter purpurogallin with hydroperoxid in very dilute solution. The crude preparations as well as those purified with mercurial salts being 5 times more active, contain 7-8% of nitrogen; they are very easily soluble in water and they show no reducing qualities; however by acid hydrolysis they will split off more than 50% of carbohydrate, generally pentoses, reducing the fehling solution.

The peroxidases preparations obtained by the described method may be used in the technical industries, viz., in oxidation processes of very sensitive and valuable substances, and in therapeutic for the reviving of oxidation processes of living organism.

Example: 5 kg. roots of *Cochlearis Armoracia* L (horseradish) are cut into fine slices, dialyzed in flowing water for some days, and then put into 10 liters of 0.3% oxalic acid. After four hours they are pressed off and then finely ground. The water is then sucked off the paste and this latter is washed again with water for several hours, then pressed again as fast as possible and now thoroughly mixed with 1½-2 liters of a barium hydroxid solution saturated at normal temperature. After ½ hour the liquid, which has meantime become enzymatically very active, is pressed off, then, if necessary, neutralized with a dilute acid and mixed with the same volume of alcohol. Next day, an inactive white precipitate is filtered off and the clear liquid at a temperature of less than 40° C. is concentrated to about 70 ccm. Then it is filtered again and the peroxidase preparation is precipitated by addition of 350 ccm. of alcohol, filtered and dried, not exceeding 40° C.

For further purification 4 parts of this product are dissolved in 100 parts of water and 10 parts of a 5% mercury chlorid solution are added. A thick precipitate is formed from which the solution is filtered off, then washed with some water containing some mercury chlorid and from the brown filtrate, the ferment is precipitated by an addition of 6 times the volume of alcohol. On redissolving the obtained precipitate in very little water, a considerable quantity of inactive substance, containing mercury, remains undissolved. This is separated by a hydro-extractor and then the ferment is again precipitated with alcohol. If it still contains mercury, the dissolving in water and precipitating with alcohol is repeated. 0-04 mg. of the isolated dry preparation dissolved in 2 ccm. water when added to a solution of 5 gr. pyrogallol and 50 mg. hydroperoxid in 2 liters of water at 20° C. will form in 5 minutes, i. e. until the interruption of the enzymatic reaction by addition of diluted sulfuric acid, 20-28 mg. purpurogallin, which can be separated by ether and determined by colorimetric method.

What I claim and desire to secure by Letters Patent is:—

1. Process for the manufacture of high class peroxidase preparations consisting in putting parts of plants, rich in peroxidase into dilute acid, absorbing thereby the peroxidase in the natural cellular tissue, dialyzing the soluble inactive substances extracting afterward the peroxidase with dilute alkalis from the cellular tissue and finally separating the enzym in a well known manner by fractional precipitation with alcohol from concentrated aqueous solution.

2. Process for the manufacture of high class peroxidase preparations consisting in putting parts of plants, rich in peroxidase into dilute acid, absorbing thereby the peroxidase in the natural cellular tissue, dialyzing the soluble inactive substances, extracting afterward the peroxidase with dilute alkalis from the cellular tissue dissolving the peroxidase preparation in water, precipitating with solutions of mercury salts inactive non-proteinic substances attached to the enzym, filtering the inactive precipitate and finally separating the highly active enzym with strong alcohol from its solution in a well known manner.

3. As a new product, peroxidase preparations having 4 to 18 times the activity of the known peroxidase preparations, being harmless for intravenous injections, forming a yellow to reddish brown powder, containing 7-8% nitrogen, showing no reducing qualities in solution, but on acid hydrolysis splitting off more than half of their weight of carbo-hydrates, mostly pentoses of reducing power; one mg. of the best purified peroxidase preparation transforming pyrogallol with hydrogen peroxid in 5 minutes into about 700 mg. purpurogallin if the execution is made as described in the example given hereinabove.

In testimony whereof I have signed my name to this specification.

ARTHUR STOLL.